United States Patent [19]

Schmuck

[11] 4,124,114
[45] Nov. 7, 1978

[54] DISCHARGE PUSHER ASSEMBLY AND DRIVE OF A RACK-TYPE DOUGH PROOFER

[75] Inventor: Charles M. Schmuck, York, Pa.

[73] Assignee: Teledyne Industries, Inc., York, Pa.

[21] Appl. No.: 794,017

[22] Filed: May 5, 1977

[51] Int. Cl.² ............................................. B65G 47/82
[52] U.S. Cl. .................................... 198/482; 198/747; 198/796
[58] Field of Search ............... 198/484, 485, 597, 747, 198/796, 482; 74/53

[56] References Cited

U.S. PATENT DOCUMENTS

| | | | |
|---|---|---|---|
| 3,349,928 | 10/1967 | Howard | 198/597 |
| 3,403,794 | 10/1968 | Lopez | 198/482 |
| 3,620,352 | 11/1971 | Gilgore et al. | 198/607 |

Primary Examiner—Evon C. Blunk
Assistant Examiner—Jeffrey V. Nase
Attorney, Agent, or Firm—Shoemaker and Mattare, Ltd.

[57] ABSTRACT

An improvement in unloading pusher bar actuators for rack-type dough proofers. The improved actuator includes a linkage for transferring output of a motor to the unloading pusher bar, and the linkage includes an operating arm having a compound cam follower slot defined therein. The operating arm slot includes a straight section tangentially connected to an arcuate section for maintaining pusher bar stroke speed constant during one phase of the pusher bar forward movement.

10 Claims, 3 Drawing Figures

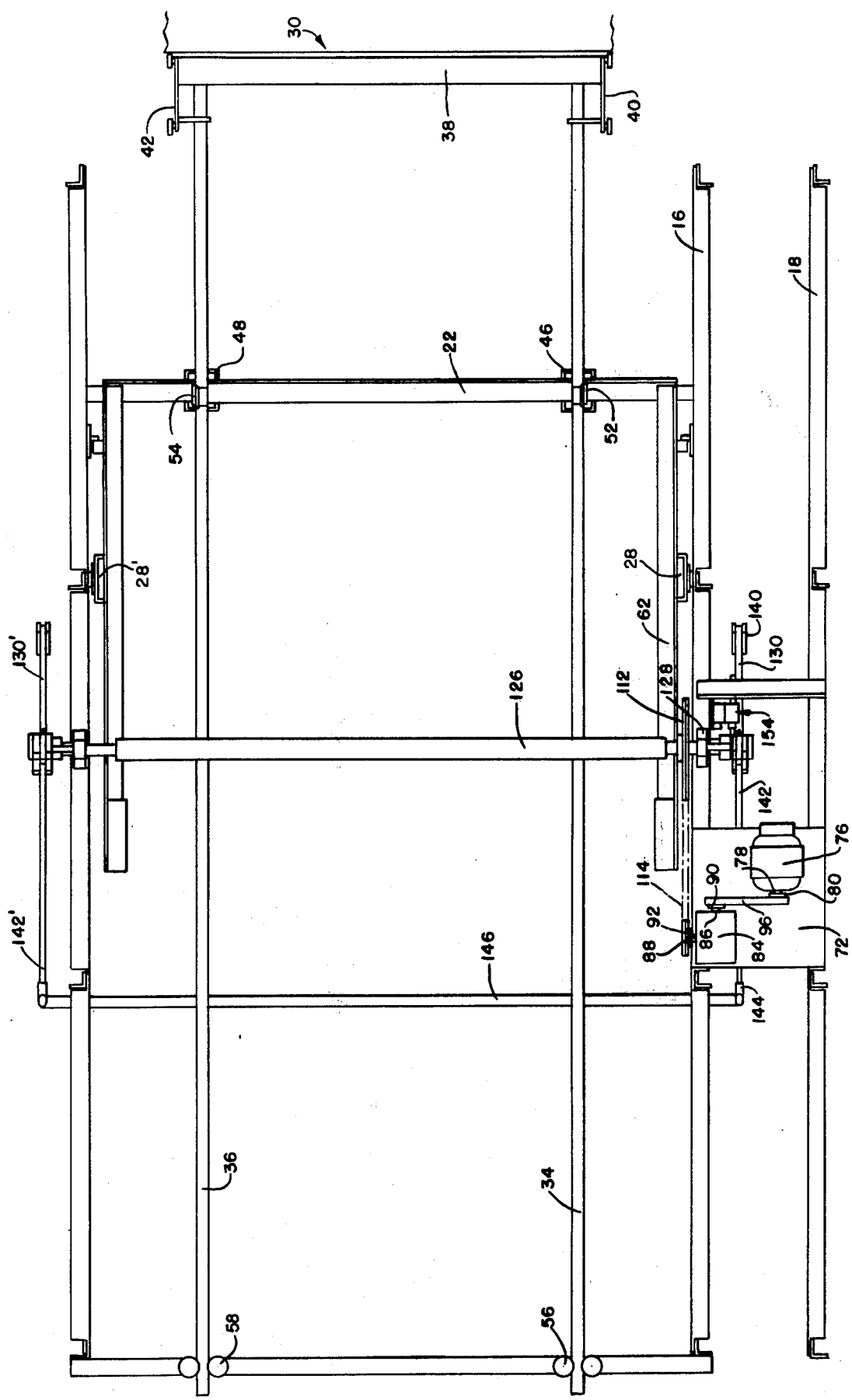

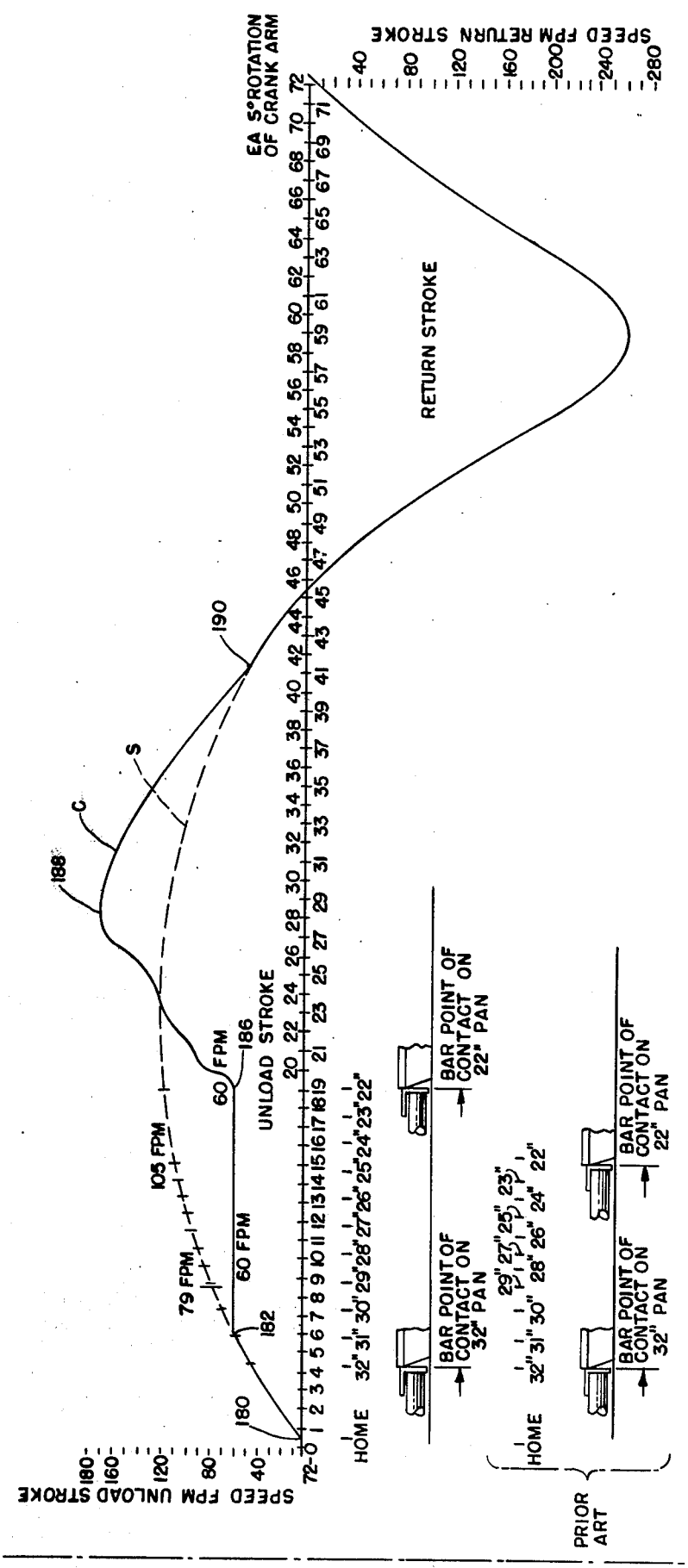

DISCHARGE PUSHER ASSEMBLY AND DRIVE OF A RACK-TYPE DOUGH PROOFER

BACKGROUND OF THE INVENTION

The present invention relates in general to continuous dough proofers, and more particularly, to improvements in unloading pusher bar assemblies used in continuous dough proofers.

U.S. Pat. Nos. 3,620,352 and 3,349,928 disclose dough proofers of the type in which successive rows of pans of dough are charged onto vertically spaced shelves of racks, and which racks are movable through a proofing chamber to a point of discharge of the pans of proofed dough.

The proofers disclosed in the just-mentioned patents use a discharge pusher assembly for moving a row of pans containing proofed dough from the proofer, and the pusher assemblies include a kinematic linkage which converts rotary motion of a motor into linear reciprocating motion of a pusher bar. The pusher bar contacts a row of pans containing proofed dough and moves that row of pans from the proofer onto a discharge conveyor.

The kinematic linkages disclosed in these patents include a crank arm coupled to a pusher bar operating arm by a cam follower on the crank arm which is slidably received in a cam slot defined in the operating arm. The operating arm is pivotally connected to a proofer frame member, and, as the crank arm is rotated by the motor, the operating arm pivots and operates the pusher bar.

The slots in the operating arms of these patents are straight and thus, the speed of the pusher bar varies sinusoidally with distance throughout the stroke thereof. Thus, the pusher bar starts out slowly from the rest, or home position, and speeds up until the forward stroke half-way position of the unloading phase is reached. At this half-way position, the pusher bar is moving at the maximum stroke speed. After passing the half-way position, the pusher bar stroke speed decreases to zero at the stroke reversal position. The sine curve shape of the stroke speed produces desirable unloading pusher cycle time advantages.

The pan straps P, shown in U.S. Pat. No. 3,620,352 or in U.S. Pat. No. 2,590,823, can have a variety of lengths depending upon the number of individual pans contained in a pan strap. Furthermore, the overall length of a single pan strap may also vary due to variations in the spacing between pans of different runs of pan sets or in the widths of the pans in different runs of pan sets.

The pusher arm in U.S. Pat. No. 3,620,352 is arranged to have a pushing stroke of a length sufficient to move a row of pans onto an unloading conveyor. The pusher bar travels a short distance, then contacts the pan during the unloading stroke. As above-discussed, the pusher bar accelerates as it travels forwardly on the discharge stroke. Thus, the impact between the pusher bar and the pan increases as the contact position is moved farther toward the forward stroke half-way position from the pusher bar starting position. As pan strap overall length varies, the contact point varies.

If the pusher bar stroke is set up to accommodate the longest pan strap, any shorter pan strap length will cause the pan-bar impact to increase. Proofed dough is sensitive to shock, and the bar-pan impact must be sufficiently low so that the danger of the proofed raised dough falling is not presented. The variation in pan strap length can be as much as 10 inches, and thus the short pans may receive an impact which is quite large in relation to the impact received by the long pans.

It is desirable to maintain the pan-bar impact within safe ranges for all pan strap lengths encountered, while retaining the cycle time advantages of a sinusoidally shaped pusher stroke speed curve without sacrificing cycle times associated with long pan straps.

SUMMARY OF THE INVENTION

The improvement embodied by the teaching of the present invention attenuates pusher bar stroke speed to maintain bar-pan contact within safe limits for a wide variety of pan strap lengths while retaining desirable overall stroke cycle times.

The improvement includes modifying the shape of the cam slot defined in the pusher bar operating arm disclosed in U.S. Pat. No. 3,349,928 and U.S. Pat. No. 3,620,352, which patents are here incorporated by reference. The incorporated patents disclose a kinematic linkage connecting a pan discharge pusher bar to a motor of a dough proofer unit, which linkage includes a pusher bar operating arm having a cam slot defined therein to slidably receive a cam follower. The cam follower is attached to a crank arm which is rotated by a motor via a gear reducer. Pan straps are disclosed in U.S. Pat. No. 2,590,823, which patent is also here incorporated by reference. The cam slot in the incorporated patents is straight, and this straight cam slot is modified according to the teaching of the present invention to include an arcuate section tangentially intersecting a straight section of the cam slot at one end of the straight section.

The arcuate cam slot section is oriented to extend forwardly of the pusher bar forward stroke so that the cam follower moves into the arcuate slot section following a short initial phase of the pusher bar forward stroke. The radius of curvature and overall arc length of the arcuate section is selected to maintain pusher bar forward stroke speed constant at a predetermined value for a predetermined portion of the forward stroke.

The stroke speed corresponding to the arcuate section is selected to produce a pan-bar impact which will be small enough as not to cause proofed raised dough in the pans to fall. The overall length of the arcuate section is selected to accommodate pan strap lengths varying within a predetermined range.

As the crank arm mechanism of the improved assembly is the same as that assembly disclosed in the incorporated patents, the total stroke time of the pusher bar including the compound slot of the present invention is unchanged from the total stroke time of the pusher bar including the straight cam slot of the incorporated patents.

The safe pusher bar speed thus retains overall unloading stroke cycle time advantages inherent in the sinusoidally shaped stroke speed curves of the incorporated patents, while maintaining pan-bar impacts at levels sufficiently low to insure a gentle treatment of pan straps having a wide variety of dimensions.

OBJECTS OF THE INVENTION

It is, therefore, a main object of the present invention to attenuate the stroke speed of a dough proofer discharge assembly pusher bar.

It is another object of the present invention to insure gentle handling of pans containing proofed raised dough in a dough proofer.

It is a further object of the present invention to handle pan straps having a variety of overall lengths in a gentle manner in a dough proofer.

It is yet another object of the present invention to unload pans from a dough proofer with a rapid unloading pusher bar cycle time.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 2 is a plan view of a section of a rack type dough proofer including the linkage embodying the teachings of the present invention.

FIG. 3 is a curve of pusher bar stroke speed versus pusher bar stroke position for the linkage embodying the teachings of the present invention superimposed on a curve of pusher bar stroke speed versus pusher bar stroke position for the linkage embodying the teachings of the incorporated patents.

DETAILED DESCRIPTION OF THE INVENTION

Figure 1:
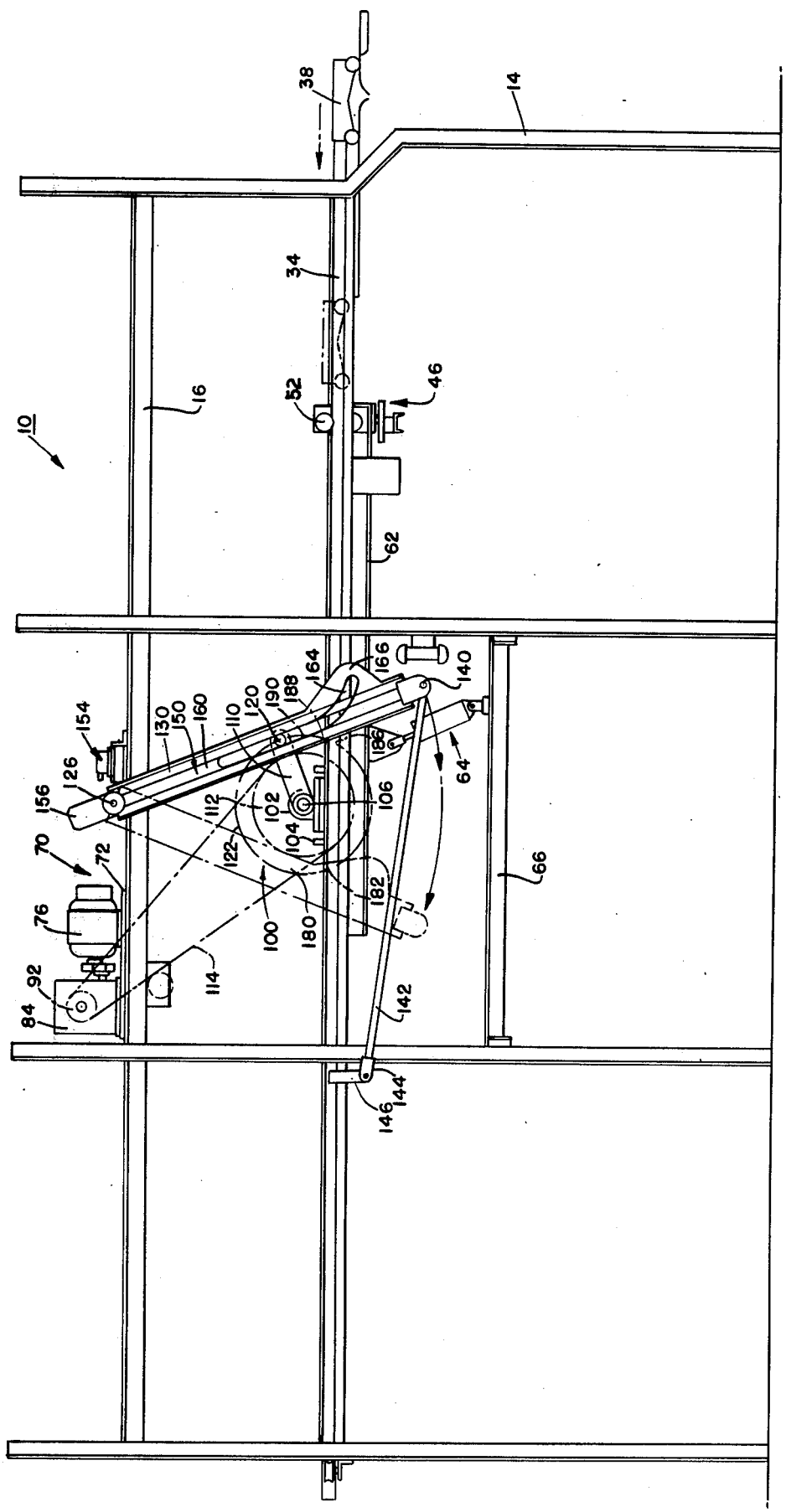
FIG. 1 is an elevation view of a section of a rack type dough proofer including the linkage embodying the teachings of the present invention.

Shown in FIG. 1 is a discharge pusher assembly 10. The assembly is preferably used in a rack type dough proofer such as the proofers disclosed in U.S. Pat. Nos. 3,349,928 and 3,620,352. The disclosures of the just-named patents are here incorporated, and reference thereto can be made for details of the proofer and the interactions of the assembly and proofer elements.

As disclosed in the referenced patents, the discharge pusher assembly moves pans of proofed dough from moving shelves across a transfer plate onto an unloading conveyor. The discharge assembly operates in timed relation with the other elements of the proofer to perform the unloading operation.

As shown in FIGS. 1 and 2 of the present disclosure, the proofer frame includes upright standards 14 to which are attached first horizontal frame members 16 and 18 forming an inner frame and an outer frame, respectively. The horizontal inner frame members have attached thereto at one end thereof a horizontal frame member and have pivotally mounted thereon at 28, 28' a U-shaped carriage 22,62.

The pusher bar carriage 30 is mounted on frame members to be freely movable from a rest position to a fully extended position along a path which is longitudinal of the inner and outer frame members. The carriage 30 includes a pair of co-planar elongate pusher bar arms 34 and 36 which are in spaced parallelism with each other, and a pusher bar 38 connected to each of the arms at one end thereof. The arms are co-extensive and the pusher bar is oriented to be parallel to the second horizontal frame members. Connecting means 40 and 42 attach the pusher bar to the arms.

Guide means 46 and 48 are mounted on carriage member 22 and forward guide rollers 52 and 54 are mounted on the guide means to contact the pusher bar arms and guide same. Rear rollers 56 and 58 are also mounted on a frame member to guide the pusher bar arms. An air cylinder 64 is attached to the carriage member 62, member 66 and controls the movement of the pusher bar carriage, as discussed in U.S. Pat. No. 3,349,928. That patent, along with the U.S. Pat. No. 3,620,352, presents a full discussion of the action of the pusher bar carriage and attention is directed thereto for further details thereof.

Pusher bar operating means is shown in FIGS. 1 and 2 of the present disclose and is generally denoted by the numeral 70. A horizontal mounting platform 72 is attached to frame members 16 and 18. A motor 76 is mounted on the platform and includes an output shaft 78 having a pulley 80 mounted thereon for rotation therewith. The motor receives power in any suitable manner. A gear reducer 84 is also mounted on the platform and includes an input shaft 86 and an output shaft 88, both extending outwardly from the gear reducer and having pulleys 90 and 92, respectively, mounted thereon for rotation therewith. A timing belt 96 is trained around pulleys 80 and 90 so that rotation of the motor output shaft is transmitted to the gear reducer.

A crank mechanism 100 is mounted on frame member 16 and includes a bracket 102 mounted on the frame member 16 by bolts 104. An elongate connecting rod 106 is rotatably received in the bracket and has a crank arm 110 mounted on one end thereof for rotation therewith. The crank arm is mounted to rotate in a vertical plane about the bracket. A pulley 112 is also mounted on the connecting rod 106 for rotation therewith. An endless chain 114 is trained around pulleys 92 and 112 to connect the gear reducer to the connecting rod, and thereby transfer the motor output to the crank arm via the gear reducer, the connecting rod and pulley 112. Thus, after an appropriate reduction, motor output is transferred to the crank arm to cause that crank arm to rotate at a desired rotational speed when the motor is actuated.

The crank arm is elongate and is connected at one end thereof to the connecting rod to extend radially outward therefrom. A cam follower 120 is mounted on the outward end of the crank arm. The path of the cam follower is indicated by phantom line 122 in FIG. 1.

An elongate stub shaft 126 is rotatably mounted on frame member 16 by a bracket 128 and extends across the proofer frame, as shown in FIG. 2. Elongate pusher carriage operating arms 130 and 130' are each attached at one end thereof to the stub shaft to depend downwardly therefrom and to be positioned between frame members 16 and 18, as shown in FIG. 2. The arm 130 shown in FIG. 1 has a coupling 140 on the lower free end thereof, and an elongate tierod 142 is pivotally attached at one end thereof to the operating arm by the coupling 140, and has a coupling 144 at the other end thereof. An elongate connecting rod 146 is pivotally connected at one end thereof to the coupling 144 and to arms 34 and 36 of the pusher bar carriage, thereby connecting the tierod to the pusher bar carriage. A further tierod 142' is coupled to the other end of the connecting rod and also is coupled to connecting arm 130' at the lower end of that arm. The upper end of the arm 130' is connected to the other end of the stub shaft, and the arms 130 and 130' therefore move in unison so that the carriage will not jam during the reciprocating movement thereof.

The connecting arm 130 shown in FIG. 1 has a cam slot 150 defined therein. The cam follower 120 is received in the cam slot 150 to transmit crank arm motion to the operating arm 130. Thus, a kinematic linkage is formed and includes the crank arm, the operating arms, the tierods, the connecting rod and the carriage arm to translate the rotary output of the motor 76 (via gear reducer 84) into the desired reciprocating movement of the pusher bar 38. A limit switch 154 is mounted on the frame members to control the operation of the motor, and hence the movement of the pusher bar. The operating rod 130 has a top segment 156 which contacts the limit switch to start and/or stop the motor, thereby properly sequencing movement of the pusher bar with the movement of the pans in the proofer.

The general sequencing and operation of the just-described pusher bar assembly is fully discussed in the above-referenced patents, and will, therefore, not be presented here.

The cam slot 150 has a compound shape which includes a straight section 160 extending from adjacent the upper end of the arm for a substantial length of the arm, and an arcuate section 164 tangentially intersecting the straight section at the end thereof remote from the upper arm end and curving away from the crank arm and toward the pusher bar. The arm has an apron 166 projecting therefrom to accommodate the arcuate segment 164. The length of the straight segment, the radius of curvature and the arc length of the arcuate segment are selected to properly regulate the movement of the pusher bar, and will be discussed in detail below. The slot 150 is sized to receive the cam follower in a desired sliding relation, while providing proper clearance therefor at both ends and the marginal sides thereof.

The movement of the operating arm, and hence the movement of the pusher bar, is regulated by the shape of the cam slot so that the pusher bar does not joltingly impact the proofer pans. This result will now be discussed with reference to FIG. 3.

The curves shown in FIG. 3 represent the speed of the pusher bar at various locations along the path thereof between the rest, or home, position and the fully extended position of the pusher bar. Curve "S" represents the speed distribution for a straight slot such as disclosed in the referenced patents. Curve "S" has a shape approximating the sine curve as is expected from the principles of simple harmonic motion, because the rotary motion of the crank is transferred to the operating arm by the straight slot. The pusher bar speed at any location along the discharge path can be found by simply selecting the point of interest and projecting onto the curve. For example, at the point of contact for a 22 inch pan in the prior art, the speed of the pusher bar using a straight slot is 105 feet per minute from curve "S".

As above-discussed, a high pusher bar speed causes a jolting impact on the pan which may cause proofed dough to fall. A speed of 105 feet per minute may be high enough to cause such damage, whereas a push bar speed of 60 feet per minute produces a pan-bar impact gentle enough as not to endanger the proofed raised dough in the pans. Accordingly, in the preferred embodiment, a speed of 60 feet per minute is selected for the pusher bar at impact with a pan strap.

Curve "C" is superimposed on curve "S" in FIG. 3, and represents the speed of the pusher bar using the slot 150 of the present invention. When the cam follower is located at the position indicated at 180 in FIG. 1, the pusher bar is in the rest, or home position shown in phantom lines in FIG. 1, and the cam follower is located in the lower portion of straight section 160 of the slot. Counterclockwise movement of the crank arm in FIG. 1 moves the cam follower downward in the slot straight section, and the pusher bar moves forward, over to the right in FIG. 1, with a speed profile shown in FIG. 3. The curves "C" and "S" are thus indentical at the initial phase of the pusher bar forward stroke as the cam follower is moving in the straight section of slot 150.

When the cam follower is located at position 182, the cam follower enters the arcuate section 164 of the slot 150. The curved shape of the slot arcuate section 164 corresponds to, but in the preferred embodiment, does not approximate, the arcuate movement of the cam follower. Thus, movement of the cam follower exerts a force on the operating arm, but a force which results in a forward stroke speed for the pusher bar which is constant rather than increasing. The cam follower is positioned at the forwardmost location in the slot when that follower is positioned at location 186.

After the cam follower has passed location 186, the arcuate shape of the arcuate section 164 is roughly inverse to the path followed by the cam follower. Thus, the curve "C" indicates a rapid acceleration of the pusher bar until the cam follower approaches the exit of the arcuate section at location 188.

At location 188, the cam follower is moving on a path which is again approximated by the arcuate section as the cam follower is moving upward with respect to the operating arm, and that arm decelerates more rapidly than an arm with a straight slot. When the cam follower reaches location 190, and again enters the straight segment of the slot, the speed of the pusher bar again follows the sinusoidal curve, and curves "S" and "C" coincide for the remainder of the cycle.

The superpositioning of curves "C" and "S" shows the pusher bar speed attenuation effected by the compound slot 150, and as seen in FIG. 3, using the curved slot, the pusher bar contacts the pan with a speed of 60 feet per minute whether the pan length is 32 inches, or 22 inches, or any value therebetween.

As above-discussed, a 60 feet per minute pusher bar speed produces gentle impact between that bar and a pan. As shown in FIG. 3, a 32 inch pan will be contacted by a pusher bar traveling at about 45 feet per minute in both the device of the incorporated patents and the device embodying the teachings of the present invention, whereas a 31 inch pan will be contacted by a pusher bar traveling at about 60 feet per minute in both devices. On the other hand, however, a 29 inch pan will be contacted by a pusher bar traveling at about 79 feet per minute in the devices disclosed in the incorporated patents, whereas because of the compound curve shape of slot 150 embodying the present invention, the 29 inch pan will be contacted by a pusher bar which is still moving at about 60 feet per minute. Further, a 22 inch pan in the devices of the incorporated patents will be contacted by a pusher bar traveling at approximately 105 feet per minute, while that 22 inch pan in the device embodying the teachings of the present invention will be contacted by a pusher bar which is still moving at 60 feet per minute.

Thus, in the preferred embodiment, the arc length and the radius of curvature of the arcuate section is selected so that any pan from 31 inches to 22 inches in length will be engaged by a pusher bar moving at 60 feet per minute. At this pusher bar speed, no matter whether pan length is 31 inches or 22 inches, or any length therebetween, danger of the proofed raised dough falling is eliminated.

While the 60 feet per minute, and 22 inch to 31 inch ranges are preferred, the orientation with respect to straight section 160, the radius of curvature and/or the arc length of the arcuate section 164 can be selected to produce any suitable pusher bar speed for the desired portion of the cam follower movement.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. In a rack-type dough proofer of the type having a discharge pusher assembly which undergoes sinusoidal cyclic movement and which comprises a motor mounted on a proofer frame element, a crank arm rotatably mounted on a proofer frame element and connected to the motor to be rotatably driven thereby, an elongate operating arm having a straight cam slot defined therein and pivotally connected at one end thereof to a proofer frame element and connected to the crank arm via the cam slot to be pivoted thereby, a tierod connected to the operating arm to move therewith, and a pusher bar assembly slidably mounted on the proofer frame element and connected to the tierod to undergo a reciprocating movement between a rest position and a fully extended position, an improvement comprising:

connecting means connecting the crank arm to the operating arm, said connecting means including attenuating means for attenuating movement of the pusher bar assembly so that the pusher bar assembly maintains a constant speed for a predetermined distance during the reciprocating movement thereof, said attenuating means including an arcuate slot section added to the cam slot, said predetermind distance including a location of initial contact between said pusher bar assembly and a pan containing proofed dough so that pusher bar assembly stroke speed can be maintained within prescribed limits at initial bar assembly-pan impact for a variety of pan lengths while overall cycle times and pusher bar assembly speeds of the pusher bar assembly remain within prescribed limits.

2. The rack-type dough proofer defined in claim 1, wherein said predetermined distance begins adjacent the pusher bar assembly rest position.

3. The rack-type dough proofer defined in claim 1, wherein the crank arm is elongate and is connected at one end thereof to the proofer frame element, said connecting means further including a cam follower connected at the other end of the crank arm with said cam follower being slidably received in the operating arm slot.

4. The rack-type dough proofer defined in claim 1, wherein the proofer further includes a gear reducer connecting the motor to the crank arm.

5. The rack-type dough proofer defined in claim 1, wherein said arcuate slot section tangentially intersects the straight cam slot and is located adjacent the end of the operating arm which is remote from said one end.

6. The rack-type dough proofer defined in claim 5, wherein said arcuate slot section extends from the straight section toward the pusher bar assembly fully extended position.

7. The rack-type dough proofer defined in claim 6, wherein said arcuate slot section curves downwardly from the cam slot of the operating arm.

8. The rack-type dough proofer defined in claim 1, wherein the straight cam slot extends over a major portion of the length of the operating arm.

9. In a method of discharging pans from a rack-type proofer of the type wherein a crank arm is rotatably driven by a motor, an operating arm is connected at one end thereof to a proofer frame element and has a straight slot defined therein to which the crank arm is connected by a cam follower so that the operating arm undergoes sinusoidal cyclic movement as the crank arm is rotated and a pusher bar assembly is slidably mounted on the proofer frame element and connected to the operating arm to undergo a reciprocating movement between a rest position and a fully extended position as the crank arm rotates, an improvement comprising:

attenuating the movement of the operating arm as the crank arm rotates by adding an arcuate slot section to the straight slot so that the cam follower moves in said arcuate section prior to moving into said straight slot during an initial portion of the operating arm cyclic movement, said operating arm attenuation causing the pusher bar assembly to maintain a constant speed for a predetermined distance during the reciprocating movement thereof, said predetermined distance including a location of initial contact between the pusher bar assembly and a pan containing proofed dough so that pusher bar assembly stroke speed can be maintained within prescribed limits at initial bar assembly-pan impact for a variety of pan lengths while overall cycle times and pusher bar assembly speeds of the pusher bar assembly remain within prescribed limits.

10. The method of claim 9, wherein the improvement further includes maintaining said constant pusher bar assembly speed near the rest position of that pusher bar.

* * * * *